United States Patent [19]

Spokoyny et al.

[11] Patent Number: 5,318,102
[45] Date of Patent: Jun. 7, 1994

[54] HEAT TRANSFER PLATE PACKS AND BASKETS, AND THEIR UTILIZATION IN HEAT RECOVERY DEVICES

[75] Inventors: Felix E. Spokoyny, Costa Mesa, Calif.; Michael K. Hall, Brunswick, Me.; Henry V. Krigmont, Seal Beach, Calif.

[73] Assignee: Wahlco Power Products, Inc., Fairmont, W. Va.

[21] Appl. No.: 133,571

[22] Filed: Oct. 8, 1993

[51] Int. Cl.$^5$ .............................................. F28D 19/04
[52] U.S. Cl. .......................................... 165/10; 165/5; 165/7
[58] Field of Search ............................. 165/5, 8, 10, 7

[56] References Cited

U.S. PATENT DOCUMENTS 4,953,629  9/1990  Karlsson et al. ....................... 165/5

FOREIGN PATENT DOCUMENTS 195097  11/1984  Japan ....................... 165/5
891038   3/1962  United Kingdom ............ 165/10
1439674  6/1976  United Kingdom ............ 165/10

Primary Examiner—Albert W. Davis, Jr.
Attorney, Agent, or Firm—Howard E. Sandler

[57] ABSTRACT

A pack of heat transfer plates for regenerative heat exchangers is operationally adapted to absorb heat from a flue gas flowing in one axial direction along the main flow axis and release such heat to a combustion air flowing in another axial direction. The pack includes first and second mutually identical profiled plates which are arranged in mutually contiguous, contacting relationship with double ridges of the first plate intersecting double ridges of the second plate. The double ridges of the first and second plates extending symmetrically and obliquely in mutually opposite directions relative to the main flow axis of the heat exchange media flowing through the pack. The pack includes a third plate having provided thereon continuous extending parallel channel formers. One side of the third plate is in contiguous relationship with the second plate. The channel formers of the third plate define a second channel between the adjacent surfaces of the second and third plates in a manner that a substantially unobstructed flow of media, in both axial directions, may be established in the second channel. A plurality of the plate packs are arranged in baskets, and these baskets are located in various portions of the heat exchanger to achieve an optimum heat transfer and flow performance.

14 Claims, 3 Drawing Sheets

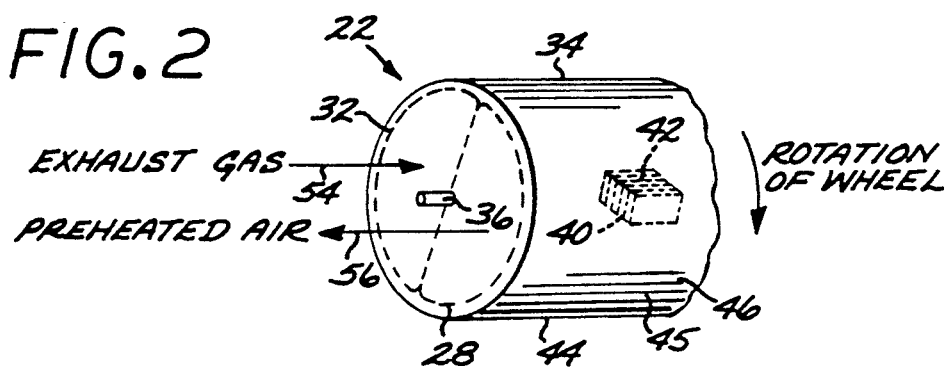
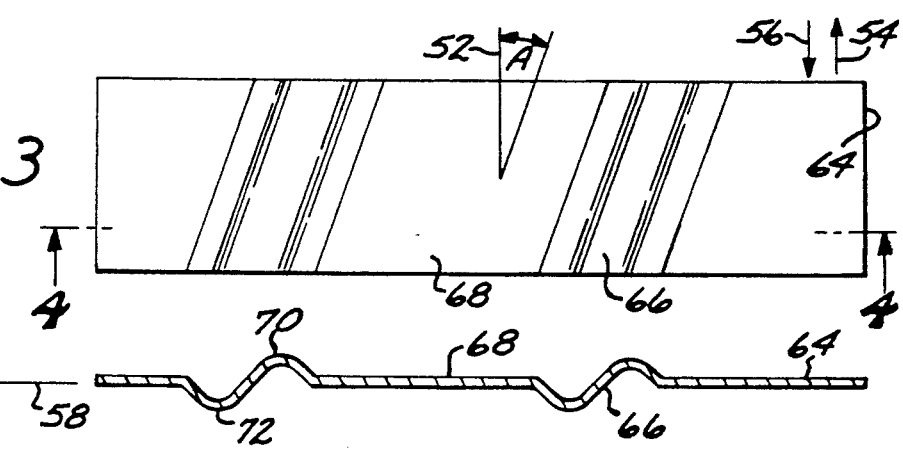
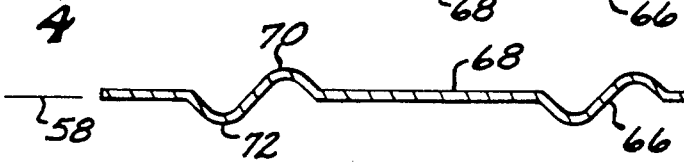
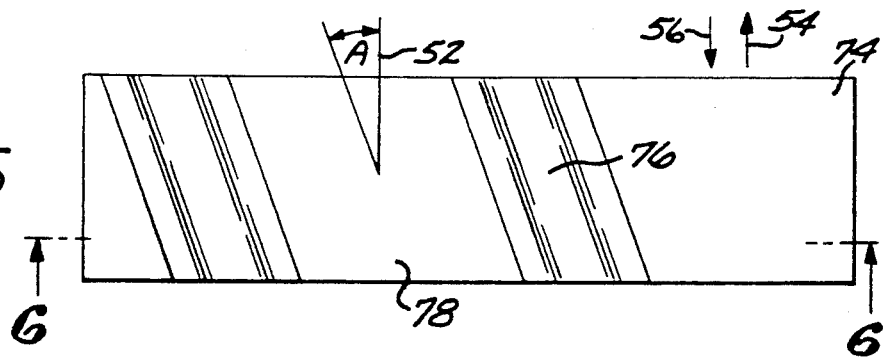
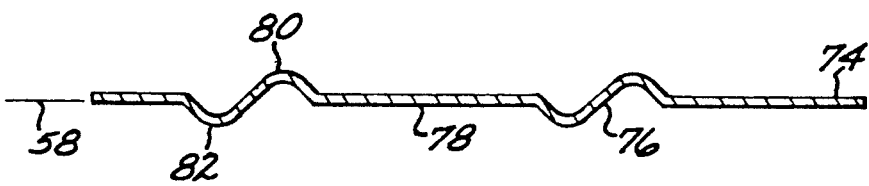

HEAT TRANSFER PLATE PACKS AND BASKETS, AND THEIR UTILIZATION IN HEAT RECOVERY DEVICES

BACKGROUND OF THE INVENTION

This invention relates to heat recovery devices, and, more particularly, to the plate packs and baskets used in regenerative heat recovery devices.

In a conventional fossil-fuel power plant, coal, oil, or gas is burned in a boiler. The resulting exhaust gas heats water to steam, and the steam turns a turbine/generator to produce electric power. The exhaust gas is directed through a heat recovery device, sometimes termed an air preheater, which transfers heat from the exhaust gas to an incoming flow of air. The preheated air flow is introduced into the boiler as the source of oxygen for combustion. Preheating of the incoming air flow improves thermal efficiency of the boiler and also reduces thermal effluent of the power plant.

The most common type of heat recovery device used for air preheating in power plants is a rotary regenerative heat exchanger. In such a heat exchanger, a large wheel is driven to rotate on a shaft. The wheel is filled with heat exchange elements that travel in circular paths with the wheel. A conduit system directs hot exhaust gas to the heat exchange elements during a first portion of their cycle of rotation, and directs cool incoming air to the heat exchange elements during a second portion of their cycle of rotation. Heat is transferred from the hot exhaust gas to the heat exchange elements during the first portion of the cycle of rotation, and heat is transferred from the heat exchange elements to the incoming air during the second portion of the cycle of rotation. Since the process is continuous, the incoming air is continuously heated as it flows around the heat exchange elements.

In a favored design, the heat exchange elements are thin steel plates having a symmetrically ridged configuration. The plates are supported in baskets rather than with fixed fasteners. This approach minimizes damage from thermal stresses and strains and permits the cleaning and replacement of the heat exchange elements as necessary.

The plate packs of the heat exchanger elements are engineered to maximize heat transfer and minimize pressure drop, and also to minimize the effects of fouling of the heat exchanger plates due to deposition of particulate (also called "fly ash") from the exhaust gas onto the plates. When the exhaust gas passes through the heat exchanger, it often has not yet been subjected to electrostatic precipitation or other treatment to remove excessive amounts of particulates produced during combustion. Deposition of the particulate onto the plates, which reduces their gas flow and heat transfer efficiency, is therefore a consideration in design of the plate packs. It is also desirable to permit periodic cleaning of the plates by soot blowing techniques to remove accumulated particulate.

While a number of designs for heat exchanger plates have been advanced, these designs suffer from shortcomings in their combination of fouling, pressure drop, heat transfer, and cleaning characteristics. There is therefore an ongoing need for improved plate and plate pack designs. The present invention fulfills this need, and further provides related advantages.

SUMMARY OF THE INVENTION

The present invention provides a heat exchanger incorporating a heat exchanger plate pack that achieves good heat transfer and also good resistance to fouling by deposited particulate from the exhaust gas. The plate pack is also more readily cleaned by periodic soot blowing than prior plate pack designs. The pressure drop of the flue gas as it flows through the pack is reduced as compared with conventional designs. The plate pack is constructed from two plate configurations that are manufactured by conventional plate-rolling techniques.

In accordance with the invention, a pack of heat transfer plates for regenerative heat exchangers is operationally adapted to absorb heat from a flue gas flowing in one axial direction along the main flow axis and release such heat to a combustion air flowing in another axial direction. The plate pack includes first and second mutually identical profiled plates which are arranged in mutually contiguous relationship and which form a first channel for passage of a heat exchange media. The first channel extends between adjacent opposing surfaces of the first and second plates. Each of the plates are provided thereon mutually parallel sets of straight continuous double ridges which project symmetrically from both opposite sides of each of the plates. The plates are oriented such that the double ridges of the first plate intersect the double ridges of the second plate, and the first and second plates are in contact with one another solely at points of intersection of the intersecting double ridges. The double ridges of the first and second plates extend symmetrically and obliquely in mutually opposite directions relative to the main flow axis of the heat exchange media flowing through the pack, in a manner that a substantially unobstructed flow of media in an axial direction may be established in the first channel. The improvement of the present invention comprises a third plate having provided thereon continuous extending parallel channel forming means with one side thereof in contiguous relationship with the second plate. The channel forming means of the third plate forms a second channel between the adjacent surfaces of the second and third plates in a manner that a substantially unobstructed flow of media, in both axial directions, may be established in the second channel.

Further in accordance with another embodiment of the invention, there is provided a plurality of identically disposed and oriented heat transfer packs as set forth above wherein each pack is adapted to be disposed seriatim in a heat exchanger basket in a manner that the third plate in each pack has the other side thereof in contiguous relationship with the first plate of the next of the packs. The channel forming means forms a third channel between the adjacent surfaces of the third and first plates in a manner that a substantially unobstructed flow of media, in both axial directions, may be established in the third channel.

Such a plurality of packs may be used to fill baskets that are mounted in a heat exchange module. The baskets may be arranged to fill various parts of the module, such as the hot end layer only, the hot end and intermediate layers, the intermediate layer only, the cold end and intermediate layers, the cold end layer only, and the like. A catalyst may be coated onto some or all of the surfaces of the plate packs.

This configuration produces a plate pack having asymmetric resistance to fouling by particulate deposition, for gas flowing in the region between the first and second plates. The arrangement is more highly resistant to particulate deposition than other plate pack designs, when the gas flow is in one particular direction through the plate pack, but not in the opposite direction. However, resistance to particulate deposition is required in only one direction, since only the exhaust gas, not the incoming air flow, has a significant loading of particulate.

The presence of the third plate minimizes the deposition of particulate within the plate pack, because the third plate has a straight-through configuration. Similarly, the third plate minimizes deposition of particulate between the plates of neighboring plate packs, when multiple plate packs are stacked together. The configuration of the third plate also permits a high pressure air flow to penetrate between and around the plate packs to remove accumulated particulate during periodic soot blowing operations to clean the plates.

The third plate preferably has a pattern of straight-through continuous corrugations or undulations across its entire width. The first and second plates preferably have spaced-apart double ridges or notches oriented at angles to those of the third plate. The first and second plates have identical double ridges, so that they can be prepared using only a single set of rolling dies. The alternating effect of the first and second plates is achieved by turning one of the plates over and providing it the described orientation, relative to the other plate, as the plate pack is assembled.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

FIG. 2 is a perspective view of a regenerative wheel-type heat exchanger;

FIG. 3 is a plan view of a first plate;

FIG. 4 is a sectional view of the first plate, taken along line 4—4 of FIG. 3;

FIG. 5 is a plan view of a second plate;

FIG. 6 is a sectional view of the second plate, taken along line 6—6 of FIG. 5;

DETAILED DESCRIPTION OF THE INVENTION

Figure 1:
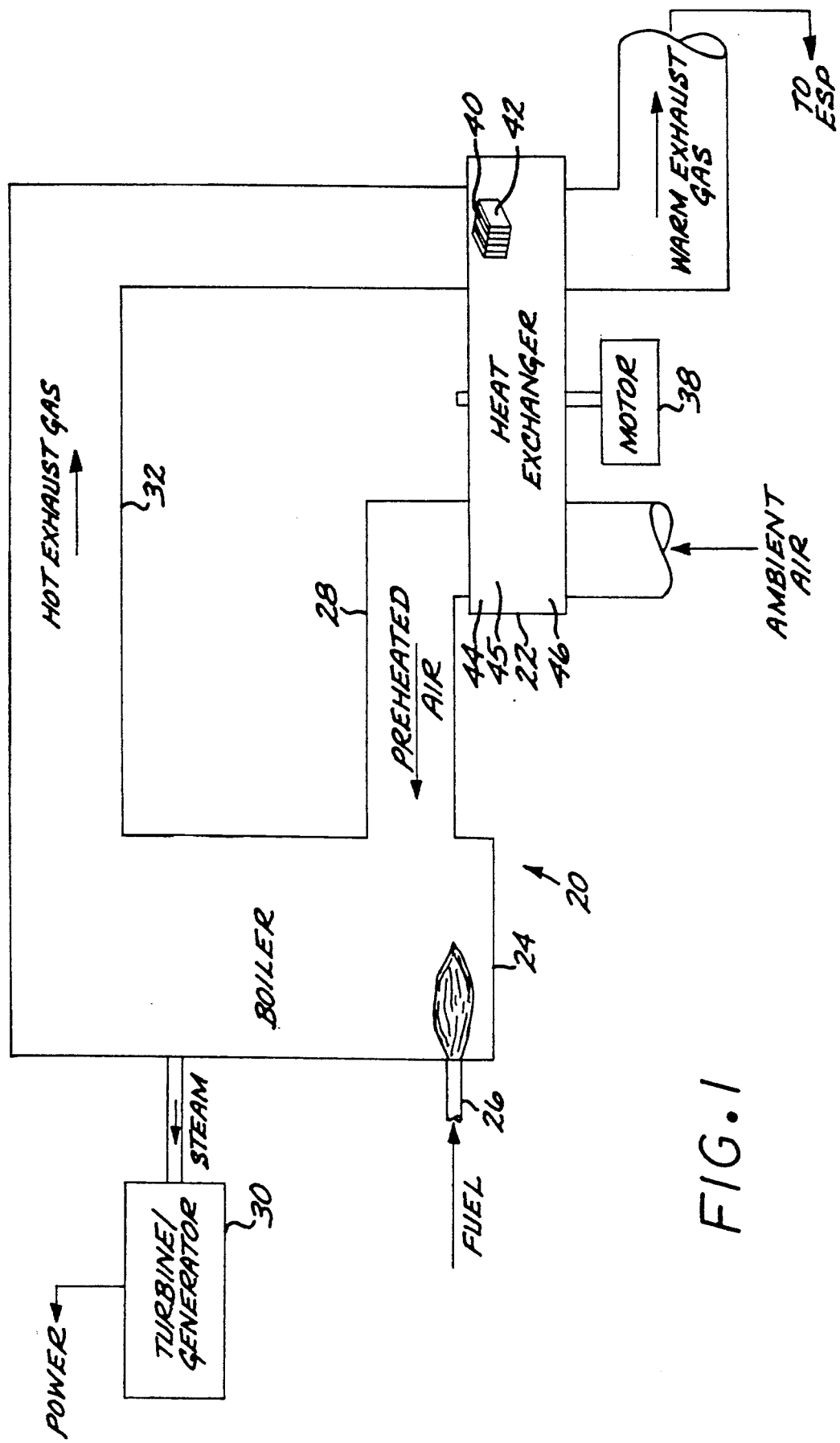
FIG. 1 is a schematic depiction of a power plant having a heat exchanger.

FIG. 1 schematically depicts a portion of a power plant 20, illustrating the relation of a rotary regenerative heat exchanger 22 to other components of the system. The power plant 20 includes a boiler 24, which receives a flow of fuel from a fuel inlet 26 and a flow of preheated air from an air conduit 28. The fuel, mixed with air, is combusted to produce hot exhaust gas. The exhaust gas heats water, converts it to steam, and the steam is supplied to a turbine/generator 30 which produces electrical power.

The hot exhaust gas flows from the boiler 24 through an exhaust gas conduit 32 to the heat exchanger 22 (also sometimes termed an "air preheater"), depicted in greater detail in FIG. 2 as a rotary heat exchanger. The heat exchanger 22 includes a wheel 34 mounted to turn on a shaft 36. A motor 38 drives the shaft and thence turns the wheel 34. Heat exchanger elements 40 are mounted within the wheel 34, in baskets 42.

The heat exchanger elements 40 are heated when the rotation of the wheel 34 brings them into registry with the exhaust gas conduit 32. The wheel 34 rotates to bring the previously heated heat exchanger elements 40 into registry with the air conduit 28, and heat is transferred from the heat exchanger elements 40 to the air in the conduit 28. The air is thereby preheated for introduction into the boiler 24.

For descriptive purposes, the heat exchanger 22 may be divided into layers corresponding to the temperature of the gas in each layer. For example in FIG. 2, there is a hot end layer 44, an intermediate layer 45, and a cold end layer 46. There are corresponding hot end baskets, intermediate layer baskets, and cold end basket containing the heat exchange elements.

In the past, the heat exchanger elements used in such a rotary regenerative heat exchanger have preferably been thin, flat steel plates with periodic corrugations, undulations, or notches in the surfaces. The configuration of such plates and plate packs assembled from the plates are selected to achieve good heat transfer, mechanical rigidity, and cleanability. Examples of such plates and plate packs are disclosed in U.S. Pat. Nos. 4,449,573 and 4,953,629.

The present invention relates to an improved configuration of a plate pack for use in the heat exchanger, and the heat exchanger utilizing such plate packs. A plate pack 50 according to the invention utilizes three plates. Two of the plates are identical in the sense that they can be produced using the same manufacturing techniques. The plates are then specially oriented for use in the plate pack 50. Multiple plate packs are stacked together for use in the heat exchanger.

Figure 7:
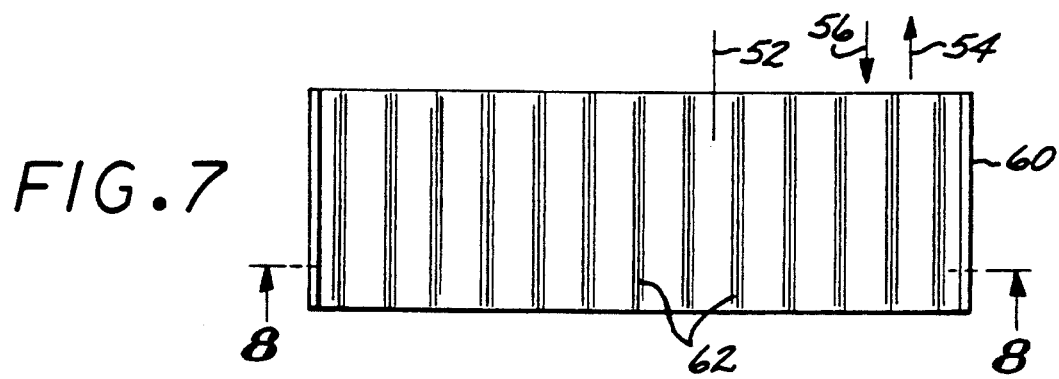
FIG. 7 is a plan view of a third plate.
Figure 8:
FIG. 8 is a sectional view of the third plate, taken along line 8—8 of FIG. 7.
Figure 9:
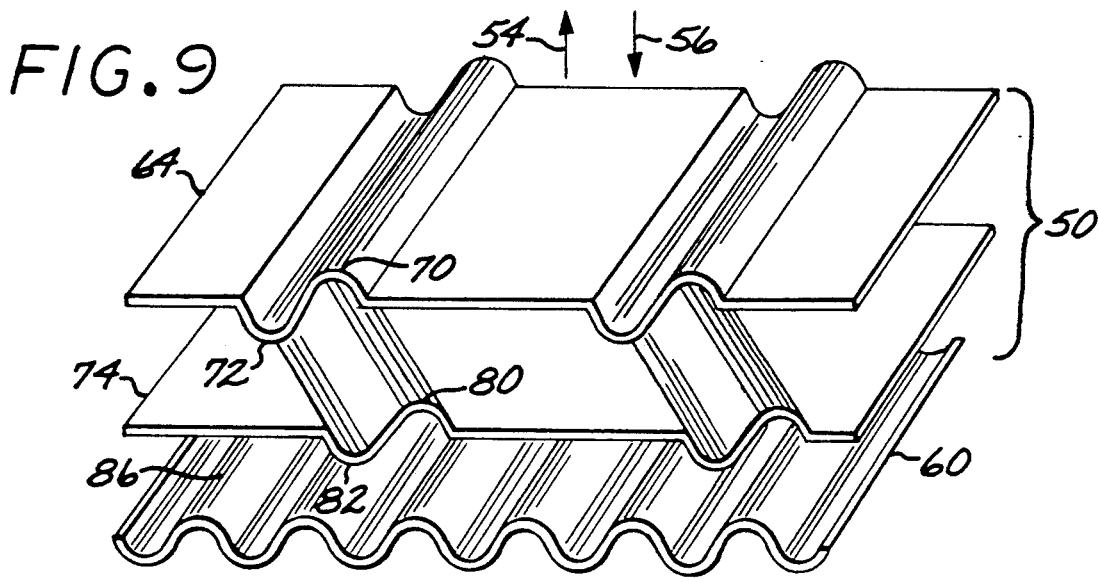
FIG. 9 is a perspective exploded view of a plate pack using the first, second, and third plates from a first side of the plate pack.

FIGS. 3-8 show respective plan and sectional views of the three plates, and FIG. 9 shows the plate pack 50 in exploded view after assembled. In each of FIGS. 3, 5, and 7, a first reference line 52 is indicated. The first reference line 52 is parallel to the gas flows in the conduits 32 and 28 as the gas flows enter the wheel 34. These gas flows are both parallel to the first reference line 52, but are in opposite directions. The gas flow direction in the exhaust gas conduit 32 is indicated by vector 54, and the gas flow direction in the air conduit 28 is indicated by the vector 56. A feature of the plate pack 50 is that the behavior of the plate pack depends upon the direction of the gas flow. A second reference line 58 is indicated in FIGS. 4, 6, and 8. The second reference line 58 lies in the plane of the plates and perpendicular to the first reference line 52.

A first plate 64 is illustrated in FIGS. 3 and 4. The first plate 64 has a plurality of double ridges 66 or notches. The double ridges 66 are preferably spaced apart, so that each double ridge 66 is separated from an adjacent double ridge 66 by a flat plate region 68. The double ridges 66 are obliquely oriented at a clockwise acute angle A to the first reference line 52 in the plan view of FIG. 3. Each of the double ridges 66 includes a ridge 70 extending to one side of the plate 64 and an adjacent trough 72 that extends symmetrically to the other side of the plate. Alternatively, each double ridge could be viewed as a ridge 70 extending above one side of the plate and a ridge extending above the opposite side of the plate, when the first plate 64 is viewed in the sectional view of FIG. 4. The ridges and troughs are arranged in a uniform fashion relative to the second reference line 58. Specifically, in the sectional view of FIG. 4 each trough 72 is to the left of its respective ridge 70.

A second plate 74 is illustrated in FIGS. 5 and 6. The second plate 74 has a plurality of double ridges 76, which are of the same form as the double ridges 66. The double ridges 76 are preferably spaced apart, so that each double ridge 76 is separated from an adjacent double ridge 76 by a flat plate region 78. The double ridges 76 are obliquely oriented at a counterclockwise acute angle A to the first reference line 52 in the plan view of FIG. 5. The angles A are preferably each from about 10 to about 40 degrees in magnitude. Each of the double ridges 76 includes a ridge 80 and an adjacent trough 82, when the second plate 74 is viewed in the sectional view of FIG. 6. The ridges and troughs are arranged in a uniform fashion relative to the second reference line 58. Specifically, in the sectional view of FIG. 6 each trough 82 is to the left of its respective ridge 80. The troughs 72 and 82 are oriented in the same manner relative to their respective ridges 70 and 80, as illustrated in FIGS. 4 and 6.

A third plate 60 is depicted in FIGS. 7 and 8. The third plate 60 has a plurality of continuous undulations or ridges 62 that extend parallel to the first reference line 52. The ridges 62 are preferably regular in form and disposed immediately adjacent to each other as shown, but need not be. In the preferred form, the ridges 62 are biloped and extend to either side of the plate 60 with a generally regular, periodic form.

In assembling the plate pack 50, the second plate 74 is stacked onto the third plate 60, and the first plate 64 is stacked onto the second plate 74, with the relative orientations shown. When the plates are assembled in this manner, they are supported at a fixed relation to each other only by the contact between the tops of the ridges and troughs in one plate with the tops of the ridges and troughs in the neighboring plates. Each plate contacts its adjacent plates only at the tops of the ridges (or bottoms of the troughs).

When arranged in this manner, the plates of the plate pack 50 define two channels for the flow of gas between the plates. A first channel 84 lies between the first plate 64 and the second plate 74. A second channel 86 lies between the third plate 60 and the second plate 74.

Figure 10:
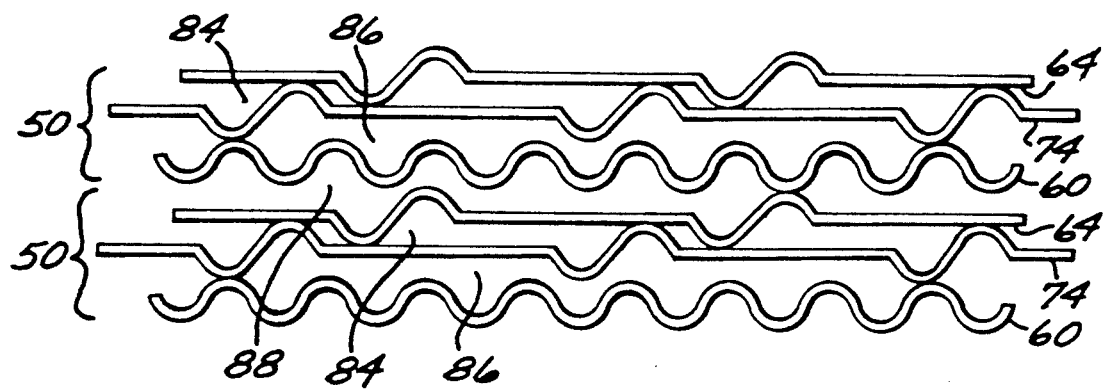
FIG. 10 is a sectional view of a portion of a heat exchange module utilizing stacks of plate packs of the kind shown in FIG. 9.

The pattern of stacked plate packs can be repeated indefinitely as shown in FIG. 10, by stacking together a plurality of plate packs 50, each assembled according to the above description, on top of each other. In forming such a stack of plate packs 50, a third channel 88 is defined between the third plate 60 of one plate pack and the first plate 64 of an adjacent plate pack.

The plate pack 50 of the invention achieves performance superior to that of the other known arrangements of plates in a plate pack, such as set forth in the ,573 and ,629 patents. Exhaust gas flows in the first channel 84 between the first plate 64 and the second plate 74, generally in the direction 54 relative to the plate pack 50 of FIG. 9. As it passes across the double ridges 66 and 76 of the respective first plate 64 and second plate 74, the exhaust gas flowing in the main direction 54 along the trough 70 of the first plate 64 (with respect to the first channel 84) first encounters the outwardly bowed ridge 82 of the second plate 74 and then encounters the inwardly bowed (with respect to the first channel 84) ridge 80 of the second plate 74. Similarly, the exhaust gas flowing the main direction 54 along the trough 82 of the second plate 74 (with respect to the first channel 84) first encounters the outwardly bowed ridge 70 of the first plate 64 and then encounters the inwardly bowed ridge 72 of the first plate 64. This arrangement discourages the deposition of particulate matter in the area of ridge intersections. An alternate arrangement where the gas flowing along the troughs (with respect to the first channel 84) first encounters an inwardly bowed portion and then an outwardly bowed portion of each plate has the opposite result, of encouraging the deposition of particulate matter. Therefore, in the present invention, the exhaust gas flow direction 54 is arranged to coincide with the direction which discourages deposition of particulate. The air flow direction 56 coincides with the direction which encourages particulate deposition. This orientation does not, however, present a problem, because the input air flow has substantially no particulate therein.

The portion of the exhaust gas flowing in the direction 54 within the second channel 86 and the third channel 88 is substantially unobstructed. Since these channels 86 and 88 are formed in part by the third plate 60 with its ridges 62 extending parallel to the direction 54, these conditions are not favorable for particulate deposition. Any deposited particulate can be readily removed by periodic soot blowing with a soot blowing lance (not shown).

Thus, in the present approach the third plate 60 of different structure is provided adjacent to the second plate 74 of the conventional plate pack having the first plate 64 and the second plate 74. The particulate-laden exhaust gas is made to flow in the first channel 84 between the first plate 64 and the second plate 74 in the direction 54 such that particulate deposition is minimized. The exhaust gas flows in the same direction in the second and third channels in a less obstructed manner because the channel forming features, in this case the ridges 62, of the third plate 60 extend parallel to the direction 54. The removal of particulate from the second and third channels is also aided by the configuration of the ridges 62 that lie parallel to the direction 54 (and 52). Selection of this configuration and arrangement of the plates 64, 74, and 60 therefore yields unexpected advantages not possible with conventional plate packs. In order to realize the maximum efficiency of the present invention, the upstream ends of plates 64, 74 and 60 (as considered with respect to the direction of exhaust gas flow 54) should be positioned in all baskets 42 in the same manner.

It is important to avoid excessively large pressure drops through a heat exchanger and maintain the same or increased thermal load. Comparative pressure drop and heat transfer studies have been performed for the plate pack 50 of the invention and for conventional configurations of plate packs such as found in the '573 and '629 patents. The present approach exhibits an improved performance as compared with the conventional plate packs. These studies have also shown that for the plate pack 50 of the invention pressure drop for gas flowing in the direction 54 is substantially lower than for the gas flowing in the direction 56.

This corresponds to the reduced probability of particulate deposition from flue gas, which is the main cause of heating elements pluggage, progressive increase of pressure losses and heat transfer efficiency reduction. In addition to the improved cleanability of the pack 50, the layer of baskets of this invention is axially permeable enough to permit cleaning/soot blowing the next layer of elements which was unreachable for '573 and '629 patents. Another advantage of the heat transfer element packs of this invention is their improved ability to withstand increased compressive loads. This feature is extremely important for regenerative heat exchangers with horizontal axis of rotation. Still further, the present invention promotes relatively greater uniformity of compressive loading, with the resultant advantages to flow distribution and uniform back pressure.

Although a particular embodiment of the invention has been described in detail for purposes of illustration, various modifications may be made without departing from the spirit and scope of the invention. Accordingly, the invention is not to be limited except as by the appended claims.

What is claimed is:

1. In a pack of heat transfer plates for regenerative heat exchangers, which pack is operationally adapted to absorb heat from a flue gas flowing in one axial direction along the main flow axis and release such heat to a combustion air flowing in another axial direction, including: first and second mutually identical profiled plates which are arranged in mutually contiguous relationship and which form a first channel for passage of a heat exchange media, said first channel extending between adjacent opposing surfaces of the first and second plates, in which each of said plates are provided thereon mutually parallel sets of straight continuous double ridges which project symmetrically from both opposite sides of each of said plates; said plates being oriented such that the double ridges of the first plate intersect the double ridges of the second plate, and said first and second plates being in contact with one another solely at points of intersection of said intersecting double ridges; said double ridges of the first and second plates extending symmetrically and obliquely in mutually opposite directions relative to the main flow axis of the heat exchange media flowing through said pack, in a manner that a substantially unobstructed flow of media in an axial direction may be established in said first channel, the improvement comprising:

such pack including a third plate having provided thereon continuous extending parallel channel forming means with one side thereof being in contiguous relationship with said second plate; and said channel forming means of said third plate forming a second channel between the adjacent surfaces of said second and third plates in a manner that a substantially unobstructed flow of media, in both axial directions, may be established in said second channel.

2. A plurality of identically disposed and oriented heat transfer packs as specified in claim 1 wherein:

each pack is adapted to be disposed seriatim in a heat exchanger basket in a manner that the third plate in each pack has the other side thereof in contiguous relationship with the first plate of the next of said packs; and said channel forming means forming a third channel between the adjacent surfaces of said third and first plates in a manner that a substantially unobstructed flow of media, in both axial directions, may be established in said third channel.

3. A basket for heat exchangers wherein such basket is filled with a plurality of heat exchanger packs as specified in claim 2.

4. A plurality of baskets as specified in claim 3 positioned within such regenerative heat exchanger wherein said baskets are oriented such that a substantially unobstructed flow of media is established in the same axial direction.

5. A plurality of baskets as specified in claim 4 wherein said same axial direction is the direction of the flue gas flow through such heat exchanger.

6. A plurality of baskets as specified in claim 5 wherein, insofar as said second and third channels, the flow of media is substantially unobstructed in both axial directions.

7. In a regenerative heat exchanger having hot and cold ends thereof, the improvement comprising at least all of the hot end baskets are baskets configured and positioned as is specified in claim 5.

8. In a regenerative heat exchanger having hot end, cold end and intermediate layers of baskets, the improvement comprising at least all hot end and intermediate layer baskets are configured and positioned as is specified in claim 5.

9. In a regenerative heat exchanger having hot end, cold end and intermediate layers of baskets, the improvement comprising at least all intermediate layer baskets are baskets configured and positioned as is specified in claim 5.

10. In a regenerative heat exchanger having at least hot end and cold end layers of baskets, the improvement comprising at least all cold end layer baskets are baskets configured and positioned as is specified in claim 5.

11. A plurality of heat transfer packs as specified in claim 2 wherein the cross sectional area of the second channel formed between facing surfaces of the second and third plates of one heat transfer pack, is substantially equal to the cross sectional area of the third channel formed between the facing surfaces of the third plate of such one heat transfer pack and the first plate of the next of said packs.

12. A heat transfer pack as specified in claim 1 wherein said channel forming means extend substantially parallel to such main flow axis.

13. A heat transfer pack as specified in claim 12 wherein said channel forming means are parallel biloped type configurations formed on said third plate.

14. A pack of heat transfer plates as specified in claim 1 wherein said plates support a catalyst thereon.

* * * * *